(12) United States Patent
Collmer

(10) Patent No.: US 11,760,164 B2
(45) Date of Patent: Sep. 19, 2023

(54) PROCESS FOR MANUFACTURING A CAST METAL HEAT EXCHANGER HOUSING FOR A VEHICLE HEATER

(71) Applicant: Eberspächer Climate Control Systems GmbH, Esslingen (DE)

(72) Inventor: Andreas Collmer, Aichwald (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 37 days.

(21) Appl. No.: 17/191,353

(22) Filed: Mar. 3, 2021

(65) Prior Publication Data
US 2021/0276399 A1 Sep. 9, 2021

(30) Foreign Application Priority Data
Mar. 5, 2020 (DE) .................. 10 2020 105 941.8

(51) Int. Cl.
*B60H 1/22* (2006.01)
*F24H 3/06* (2022.01)

(52) U.S. Cl.
CPC ......... *B60H 1/2209* (2013.01); *B60H 1/2212* (2013.01); *B60H 2001/2271* (2013.01); *F24H 3/065* (2013.01)

(58) Field of Classification Search
CPC ...... B23K 2101/14; B21D 53/02; B23P 15/26
USPC .................................................. 237/12.3 C
See application file for complete search history.

(56) References Cited

U.S. PATENT DOCUMENTS

| 6,845,810 B2 * | 1/2005 | Siak et al. ................ 164/244 |
| 2019/0054522 A1 * | 2/2019 | Kusic ................ B22D 17/2281 |

FOREIGN PATENT DOCUMENTS

| DE | 3509349 A1 | 9/1986 |
| DE | 19734814 C1 * | 8/1997 |
| DE | 19734814 C1 | 1/1999 |
| DE | 19926264 A1 | 12/2000 |
| DE | 102019110949 A1 | 10/2020 |
| EP | 3091306 A1 | 11/2016 |
| EP | 3346219 A1 | 7/2018 |
| EP | 3597997 A1 | 1/2020 |

(Continued)

OTHER PUBLICATIONS

Wärmetauscher Eberspächer Standheizung (Eberspächer Airtronic. Teilenummer: 251 822 060 000). Stand Oct. 15, 2017. Quelle: https://www.sypad.com/warmetauscher-eberspacher-standheizung/ [abgerufen am Nov. 11, 2020].

*Primary Examiner* — Steven B McAllister
*Assistant Examiner* — John E Bargero
(74) *Attorney, Agent, or Firm* — McGlew and Tuttle, P.C.

(57) ABSTRACT

A process for manufacturing a cast metal heat exchanger housing (12) for a vehicle heater having a pot-shape housing wall (14) extending in a direction of a housing longitudinal axis (L) and having a plurality of heat transfer ribs (22) extending on an outer side of the housing wall (14) in the area of a circumferential wall (16) and in the area of a bottom wall (18) of the housing wall (14) in the direction of the housing longitudinal axis (L). The process includes metal casting wherein a sprue cross-sectional area including at least some of the heat transfer ribs (22). The cast metal heat exchanger housing has an axial end face formed upon cutting off metallic material that is essentially at right angles to the housing longitudinal axis and extends into an area of at least some of the heat transfer ribs.

20 Claims, 5 Drawing Sheets

(56) References Cited

FOREIGN PATENT DOCUMENTS

| | | | |
|---|---:|---|---:|
| EP | 3611432 | A1 | 2/2020 |
| RU | 2514944 | C2 | 5/2014 |
| RU | 2672993 | C1 | 11/2018 |
| RU | 2691570 | C1 | 6/2019 |
| SU | 84359 | A1 | 11/1949 |
| SU | 1444058 | A1 | 12/1988 |
| SU | 1774894 | A3 | 7/1992 |

* cited by examiner

PROCESS FOR MANUFACTURING A CAST METAL HEAT EXCHANGER HOUSING FOR A VEHICLE HEATER

CROSS REFERENCE TO RELATED APPLICATIONS

This application claims the benefit of priority under 35 U.S.C. § 119 of German Application 10 2020 105 941.8, filed Mar. 5, 2020, the entire contents of which are incorporated herein by reference.

TECHNICAL FIELD

The present invention pertains to a process for manufacturing a cast metal heat exchanger housing for a vehicle heater.

TECHNICAL BACKGROUND

Such a cast metal heat exchanger housing comprises a pot-shape housing wall elongated in the direction of a housing longitudinal axis. In order to make it possible to transfer heat on the outer side of the housing wall to a medium flowing around this housing wall, for example, to the air to be introduced into a vehicle, heat transfer ribs, which extend both in the area of a circumferential wall of the pot-shape housing wall and in the area of a bottom wall of the housing wall, which said bottom wall has, for example, a spherical segment-like configuration, are provided on the outer side of the heat exchanger housing.

SUMMARY

An object of the present invention is to provide a process for manufacturing a cast metal heat exchanger housing for a vehicle heater, with which a metal casting operation for manufacturing a fluidically advantageous heat exchanger housing can be carried out rapidly and precisely.

This object is accomplished according to the present invention by a process for manufacturing a cast metal heat exchanger housing for a vehicle heater with a pot-shape housing wall elongated in the direction of a housing longitudinal axis and by a plurality of heat transfer ribs, which extend in the direction of the housing longitudinal axis on an outer side of the housing wall in the area of a circumferential wall and in the area of a bottom wall of the housing wall, in which process a sprue cross-sectional area comprises at least some of the heat transfer ribs.

The sprue cross-sectional area is the cross-sectional area of an opening provided in a casting mold, through which the molten metallic material is poured into the casting mold used to manufacture the heat exchanger housing.

In order to make it possible to pour the hot, molten metallic material into the mold as quickly as possible and thus to make it possible to fill all mold cavities with the molten metallic material as fully and uniformly as possible, it is necessary to provide a sufficiently large sprue cross-sectional area. Due to this sprue cross-sectional area extending according to the principles of the present invention into the area of the heat transfer ribs, at least some of the heat transfer rib cross-sectional area can also be utilized to introduce molten metallic material.

In order to make it possible to provide a sufficiently large sprue cross-sectional area, it is further proposed that the sprue cross-sectional area comprise a central runner and, starting from the central runner, a plurality of diagonal ribs. Since the sprue cross-sectional area also comprises, according to the principles of the present invention, some of the heat transfer ribs and extends into the area of the heat transfer ribs, a part of the sprue cross-sectional area, which part is to be provided in the area of the central runner, and a part of the cross-sectional area, which part is to be provided in the area of the diagonal ribs, can be reduced.

Provisions may be made, for example, for four diagonal ribs to extend starting from the central runner. Two diagonal ribs each may extend in relation to one another diametrically away from the central runner or/and diagonal ribs located directly adjacent to one another in the circumferential direction may be arranged essentially at right angles in relation to one another.

In order to achieve a linking of the different cross-sectional area components providing the entire sprue cross-sectional area, at least some of the heat transfer ribs may extend in the area of the sprue cross-sectional area starting from the central runner, or/and at least some of the heat transfer ribs may extend starting from the diagonal ribs in the area of the cross-sectional area.

In order to make it possible to make a large surface available for the transfer of heat to a medium flowing around the heat exchanger housing, it is proposed that the heat transfer ribs be arranged in a plurality of groups of heat transfer ribs, wherein the heat transfer ribs of each group are arranged essentially parallel to one another.

After carrying out a metal casting operation and cooling of the metallic material, a sprue can be cut off from the heat exchanger housing such that an axial end face of the heat exchanger housing, which is essentially at right angles to the housing longitudinal axis and extends in the area of at least some of the heat transfer ribs, is formed. In particular, provisions may be made in this connection for the axial end face to be formed during the cutting off of the sprue such that it extends into the diagonal ribs.

The axial end face can be formed during the cutting off of the sprue with an end face area of a central attachment or/and with an end face area of the diagonal ribs.

Further, the axial end face may be formed during the cutting off of the sprue with end faces extending into the heat transfer ribs of the groups of heat transfer ribs extending essentially parallel in relation to one another.

The present invention pertains, furthermore, to a cast metal heat exchanger housing for a vehicle heater, which can be manufactured, for example, with a process according to the present invention. This cast metal heat exchanger housing comprises a pot-shape housing wall elongated in the direction of a housing longitudinal axis and a plurality of heat transfer ribs extending in the direction of the housing longitudinal axis on an outer side of the housing wall in the area of a circumferential wall and in the area of a bottom wall of the housing wall, wherein an axial end face of the heat exchanger housing, which axial end face is formed by cutting off metallic material and is essentially at right angles to the housing longitudinal axis, extends into the area of at least some of the heat transfer ribs.

Diagonal ribs can extend radially outwards from a central attachment, which extends from the bottom wall essentially coaxially to the housing longitudinal axis, and the axial end face formed by cutting off metallic material may extend into the area of the diagonal ribs.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
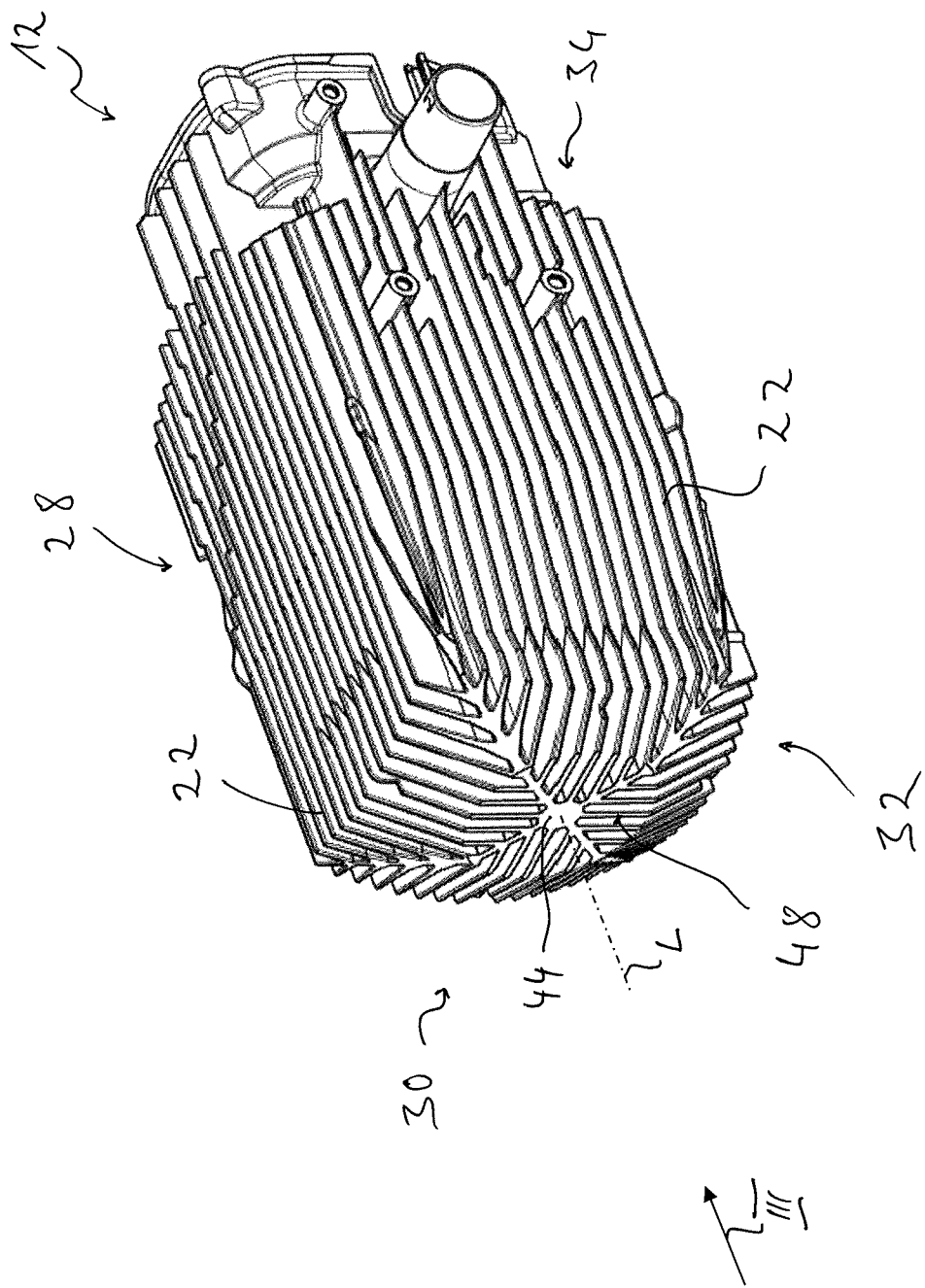
FIG. 1 is a perspective view of a cast metal heat exchanger housing for a fuel-operated vehicle heater.

Referring to the drawings, a heat exchanger housing 12 manufactured as a cast metal part, which is shown in the figures, is configured with a pot-shape housing wall 14. The pot-shape housing wall 14 comprises a circumferential wall 16 elongated in the direction of a housing longitudinal axis L and a dome-shaped or spherical segment-shaped bottom wall 18 in an axial end area. Heat transfer ribs 22 extending in the direction of the housing longitudinal axis L, which absorb heat from the exhaust gas flowing in the interior of the heat exchanger housing 12, are provided on the inner side of the housing wall 14. Additional heat transfer ribs 22, via which heat can be transferred to the medium flowing around the heat exchanger housing 12, i.e., for example, the air to be introduced into the interior of a vehicle, are provided on the outer side of the housing wall 14. This air flows in the interior of a housing 24, which accommodates the heat exchanger housing 12 and is made, for example, from a plastic material, and it leaves this in an outlet 26 formed such that it adjoins the bottom wall 18 of the heat exchanger housing 12.

The heat transfer ribs 22 provided on the outer side of the heat exchanger housing 12 and at the housing wall 14 are arranged in a total of four groups 28, 30, 32, 34 following one another in the circumferential direction. In each of these groups 28, 30, 32, 34, the heat transfer ribs 22 associated with these groups 28, 30, 32, 34 are arranged such that they extend along the housing longitudinal axis L and extend parallel to one another. The heat transfer ribs 22 of groups 28, 30, 32, 34 located directly adjacent to one another are arranged approximately at right angles in relation to one another and the heat transfer ribs 22 of groups located diametrically opposite each other are arranged essentially parallel in relation to one another.

Diagonal ribs 36, 38, 40, 42 are provided at least in the area of the outer side of the bottom wall 18 in order to obtain this structure. These diagonal ribs 36, 38, 40, 42 extend axially in the direction of the housing longitudinal axis L starting from the bottom wall 18 and radially outwards starting from a central attachment 44, which is essentially concentric to the housing longitudinal axis L and extends away from the bottom wall 18. Diagonal ribs 36, 38, 40, 42 that are directly adjacent to one another form an angle of, for example, about 90°. Diagonal ribs 36, 38, 40, 42 that are diametrically opposite each other in relation to the housing longitudinal axis L extend essentially parallel to one another.

Figure 3:
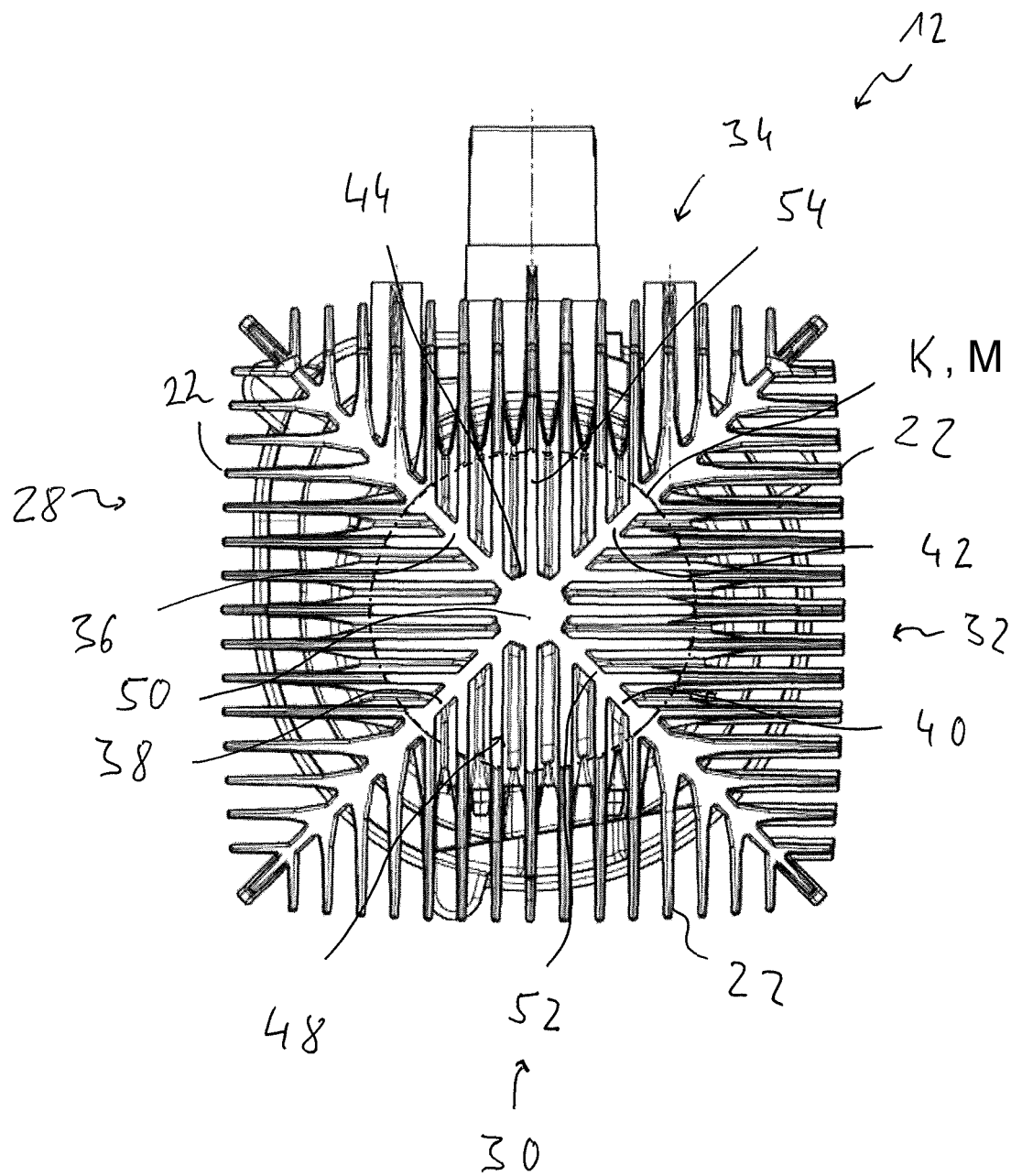
FIG. 3 is the cast metal heat exchanger housing according to FIG. 1 in viewing direction III in FIG. 1.
Figure 4:
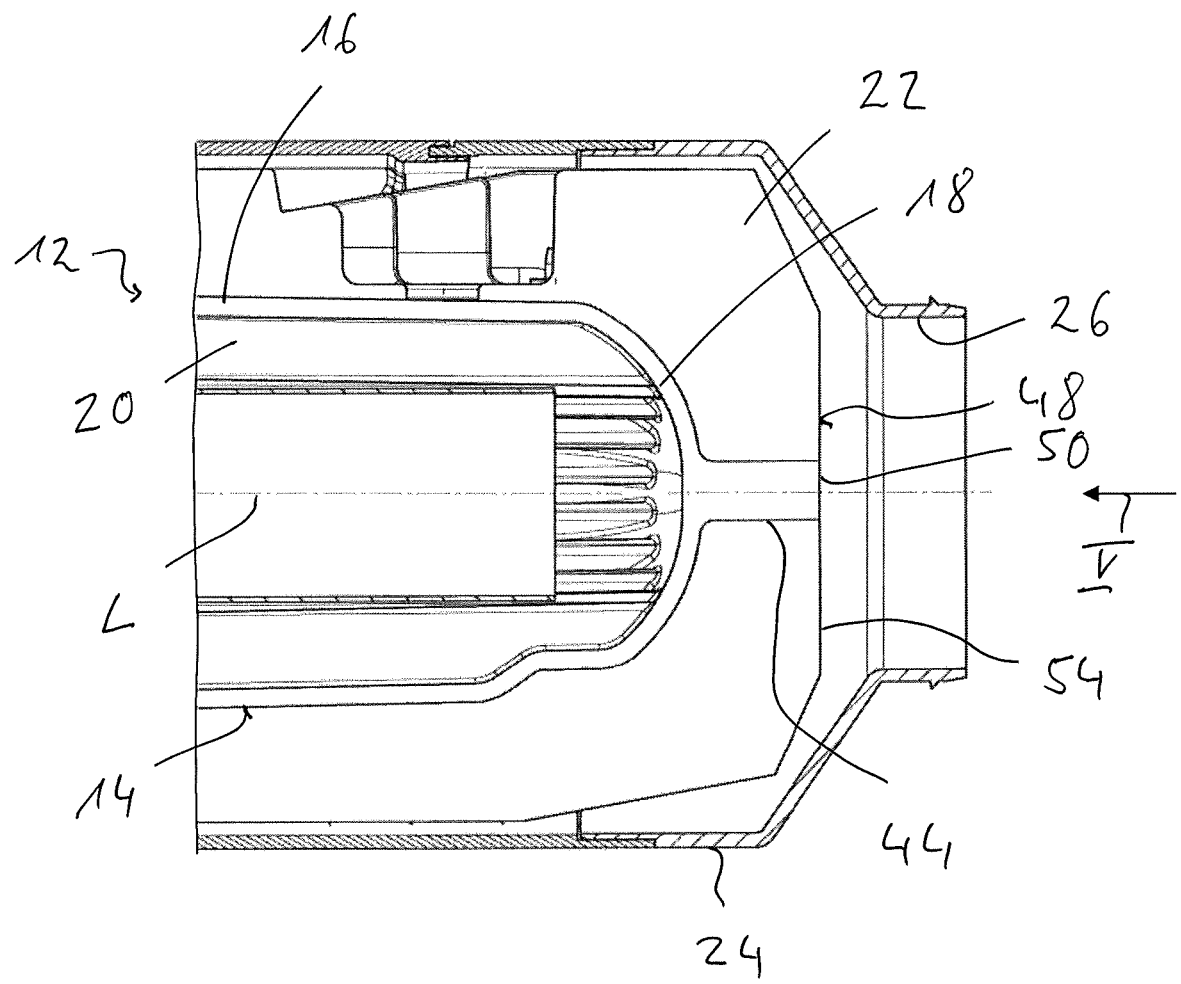
FIG. 4 is a partial longitudinal sectional view of the heat exchanger housing according to FIG. 1 in a housing of a vehicle heater.
Figure 5:
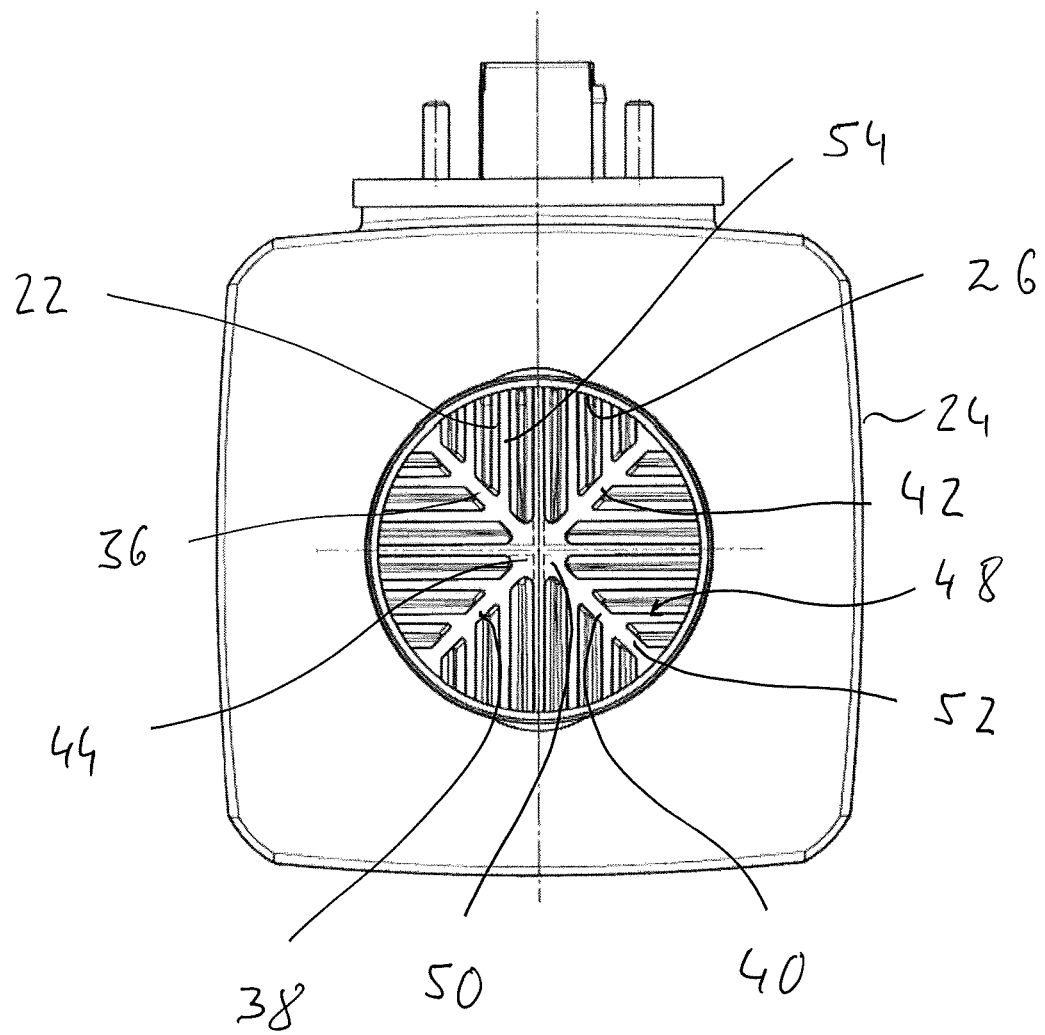
FIG. 5 is an axial view of the heat exchanger housing arranged in the housing in reviewing direction V in FIG. 4.

FIG. 3 shows clearly that some of the heat transfer ribs 22 extend starting from the diagonal ribs 36, 38, 40, 42 in each of the four groups 28, 30, 32, 34 of heat transfer ribs. Some of the heat transfer ribs 22, especially a respective central heat transfer rib of each group 28, 30, 32, 34, extend starting from the central attachment 44.

Figure 2:
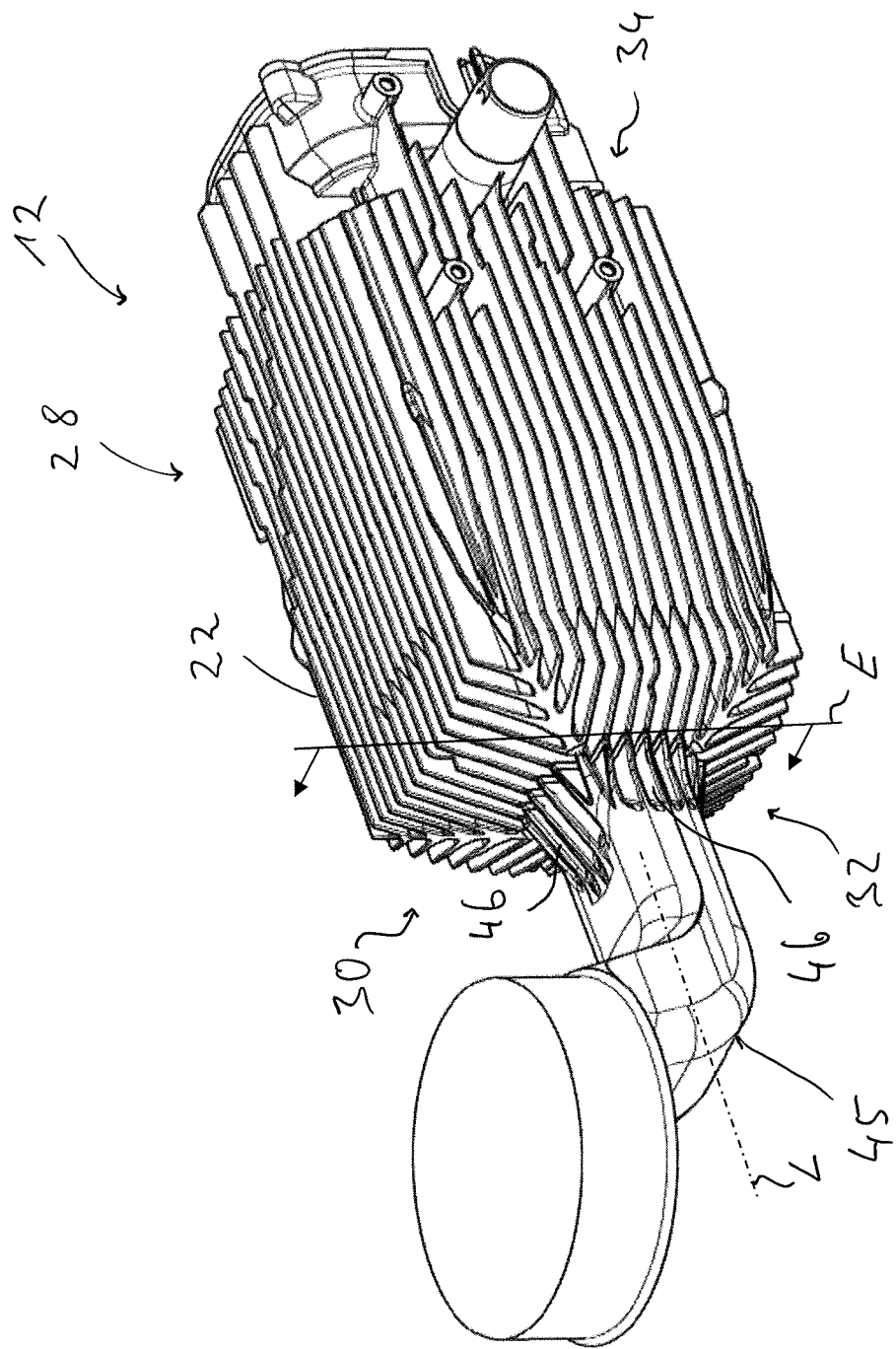
FIG. 2 is the cast metal heat exchanger housing according to FIG. 1 with a sprue, which is formed in a metal casting operation and is to be cut off from the heat exchanger housing.

The heat exchanger housing 12 is manufactured as a cast metal component in a metal casting operation with the use of a casting mold. In order to make it possible to fill the hot, molten metallic material into the casting mold, a sprue opening with a sprue cross-sectional area is provided in an area of a casting mold, which area is located close to or opposite the bottom wall 18. The sprue cross-sectional area must have a defined minimum size in order to make it possible to ensure that the hot and molten metallic material, generally liquefied aluminum or an aluminum alloy, can be filled into the casting mold and be distributed in the casting mold rapidly, so that no cavities will remain. After cooling the metallic material filled in, the blank shown in FIG. 2 is left, which comprises the heat exchanger housing 12, on the one hand, and a sprue, generally designated by 45, on the other hand.

It is ensured in the process according to the present invention that the sprue cross-sectional area extends into the area of the heat transfer ribs 42 or of some heat transfer ribs 42. As a result, the sprue 45 has rib sections 46, which correspond to the heat transfer ribs 22 or adjoin these. In order to obtain this structure, the channel formed in the casting mold or the opening formed in the casting mold for pouring in the metallic material may be configured with an opening cross section which expands in the direction of the cavity of the casting mold, which cavity receives the molten metallic material and represents essentially a negative of the heat exchanger housing 12.

After cooling of the metallic material, the sprue 45 is cut off by a cutting operation, for example, by sawing off, from the heat exchanger housing 12, so that an axial end face 48 of the heat exchanger housing 12 is left, which axial end face 48 is outlined by a circle K drawn with a dash-dotted line in FIG. 3, also corresponding to the cross-section of the opening provided within the mold M at this axial location. The sprue 45 is cut off for this purpose in a plane E that is essentially at right angles to the housing longitudinal axis L, as is illustrated in FIG. 2. This axial end face 48, which is approximately at right angles to the housing longitudinal axis L, comprises an end face area 50 of the central attachment 44, on the one hand, and it comprises, on the other hand, end face areas 52 of the diagonal ribs 36, 38, 40, 42 as well as end faces 54 of the heat transfer ribs 22 provided on the outer side of the heat exchanger housing 12. This axial end face 48 also corresponds essentially to the sprue cross-sectional area, which is provided in a casting mold and which may also be, for example, the maximum cross-sectional area of the opening in the casting mold M, which opening guides the metallic material into the cavity of the casting mold M.

Since the sprue cross-sectional area extends in the process to be carried out according to the present invention into the area of the heat transfer ribs 22, a comparatively large overall cross-sectional area can be provided for filling in the molten metallic material, without the central attachment 44 or a central runner to be provided to form the central attachment 44 with an excessively large cross section having to be provided, and without the diagonal ribs 36, 38, 40, 42 having to be provided with an excessively large cross section. A comparatively delicate structure is thus obtained, which offers only a low flow resistance to the medium flowing on the outer side of the heat exchanger housing 12. In particular, a large cross-sectional area is guaranteed for the flow for the medium to be heated in the area of the outlet 26 based on a comparatively small cross section of the central attachment 44 and based on a comparatively small cross-sectional area of the diagonal ribs 36, 38, 40, 42. At the same time, uniform admission of the hot, molten metallic material into the casting mold M, which admission is distributed over the axial end face 48 recognizable in FIG. 3, is guaranteed, so that the metallic material can also be distributed in the interior of the casting mold more uniformly and more rapidly.

While specific embodiments of the invention have been shown and described in detail to illustrate the application of the principles of the invention, it will be understood that the invention may be embodied otherwise without departing from such principles.

What is claimed is:

1. A process for manufacturing a cast metal heat exchanger housing, the process comprising:
    metal casting the metal heat exchanger housing comprising a vehicle heater pot-shape housing wall elongated in a direction of a housing longitudinal axis and comprising a plurality of heat transfer ribs extending in the direction of the housing longitudinal axis on an outer side of the housing wall in an area of a circumferential wall of the housing wall and in an area of a bottom wall of the housing wall, wherein a sprue cross-sectional area provided in a casting mold, through which molten metallic material is poured during the metal casting, comprises, in a plane that is at right angles to the housing longitudinal axis, a central runner and, starting from the central runner, at least some of the heat transfer ribs;
    subsequent to the metal casting, cooling of the metallic material; and
    subsequent to the cooling, cutting off a sprue from the heat exchanger housing at a location corresponding to the plane that is at right angles to the housing longitudinal axis to form an axial end face of the heat exchanger housing, which axial end face corresponds to the sprue cross sectional area provided in the casting mold at the plane that is at right angles to the housing longitudinal axis and is at right angles to the housing longitudinal axis and extends into the area of at least some of the heat transfer ribs.

2. The process in accordance with claim 1, wherein the sprue cross-sectional area comprises a plurality of diagonal ribs starting from the central runner.

3. The process in accordance with claim 2, wherein the plurality of diagonal ribs comprise four diagonal ribs that extend starting from the central runner and wherein:
    two of the diagonal ribs extend diametrically in relation to one another away from the central runner; or
    diagonal ribs arranged directly adjacent to one another in a circumferential direction are arranged essentially at right angles to one another; or
    two of the four diagonal ribs extend diametrically in relation to one another away from the central runner and diagonal ribs arranged directly adjacent to one another in a circumferential direction are arranged essentially at right angles to one another.

4. The process in accordance with claim 2, wherein:
    at least some of the heat transfer ribs extend starting from the central runner in the area of the sprue cross-sectional area; or
    at least some of the heat transfer ribs extend starting from the diagonal ribs in the area of the sprue cross-sectional area; or
    at least some of the heat transfer ribs extend starting from the central runner in the area of the sprue cross-sectional area and at least some of the heat transfer ribs extend starting from the diagonal ribs in the area of the sprue cross-sectional area.

5. The process in accordance with claim 1, wherein:
    the heat transfer ribs are arranged in a plurality of groups; and
    the heat transfer ribs of each group of heat transfer ribs are arranged essentially parallel to one another.

6. The process in accordance with claim 1, wherein:
    the sprue cross-sectional area comprises a plurality of diagonal ribs starting from the central runner; and
    upon cutting off of the sprue, the axial end face is formed extending into the diagonal ribs.

7. The process in accordance with claim 6, wherein:
    upon cutting off of the sprue, the axial end face is formed with an end face area of a central attachment;
    upon cutting off of the sprue, the axial end face is formed with end face areas of the diagonal ribs; or
    upon cutting off of the sprue, the axial end face is formed with an end face area of a central attachment and with an end face areas of the diagonal ribs.

8. The process in accordance with claim 1, wherein:
    the heat transfer ribs are arranged in a plurality of groups;
    the heat transfer ribs of each group of heat transfer ribs are arranged essentially parallel to one another; and
    upon cutting off the sprue, the axial end face is formed with end face portions extending into the groups of the heat transfer ribs.

9. A cast metal heat exchanger housing for a vehicle heater, the cast metal heat exchanger housing comprising:
    a pot-shape housing wall elongated in a direction of a housing longitudinal axis; and
    a plurality of heat transfer ribs extending in the direction of the housing longitudinal axis on an outer side of the housing wall in an area of a circumferential wall of the housing wall and in an area of a bottom wall of the housing wall, wherein an axial end face of the heat exchanger housing, which axial end face is formed upon cutting off metallic material and is at right angles to the housing longitudinal and extends into an area of at least some of the heat transfer ribs, wherein the cast metal heat exchanger housing is formed by a process comprising:
    metal casting the metal heat exchanger housing with a sprue cross-sectional area provided in a casting mold, through which molten metallic material is poured during the metal casting, comprising, in a plane that is at right angles to the housing longitudinal axis, a central runner and, starting from the central runner, at least some of the heat transfer ribs;
    subsequent to the metal casting, cooling of the metallic material; and
    subsequent to the cooling, cutting off a sprue from the heat exchanger housing at a location corresponding to the plane that is at right angles to the housing longitudinal axis to form an axial end face of the heat exchanger housing, which axial end face corresponds to the sprue cross sectional area provided in the casting mold at the plane that is at right angles to the housing longitudinal axis and is at right angles to the housing longitudinal axis and extends into the area of at least some of the heat transfer ribs.

10. The cast metal heat exchanger housing in accordance with claim 9, wherein the plurality of heat transfer ribs comprise diagonal ribs extending radially outwards from a central attachment extending from the bottom wall essentially coaxially in relation to the housing longitudinal axis.

11. The cast metal heat exchanger housing in accordance with claim 9, wherein the sprue cross-sectional area comprises a plurality of diagonal ribs starting from the central runner.

12. The cast metal heat exchanger housing in accordance with claim 11, wherein the plurality of diagonal ribs comprise four diagonal ribs that extend starting from the central runner and wherein:
- two of the diagonal ribs extend diametrically in relation to one another away from the central runner; or
- diagonal ribs arranged directly adjacent to one another in a circumferential direction are arranged essentially at right angles to one another; or
- two of the four diagonal ribs extend diametrically in relation to one another away from the central runner and diagonal ribs arranged directly adjacent to one another in a circumferential direction are arranged essentially at right angles to one another.

13. The cast metal heat exchanger housing in accordance with claim 11, wherein:
- at least some of the heat transfer ribs extend starting from the central runner in the area of the sprue cross-sectional area; or
- at least some of the heat transfer ribs extend starting from the diagonal ribs in the area of the sprue cross-sectional area; or
- at least some of the heat transfer ribs extend starting from the central runner in the area of the sprue cross-sectional area and at least some of the heat transfer ribs extend starting from the diagonal ribs in the area of the sprue cross-sectional area.

14. The cast metal heat exchanger housing in accordance with claim 9, wherein:
- the heat transfer ribs are arranged in a plurality of groups; and
- the heat transfer ribs of each group of heat transfer ribs are arranged essentially parallel to one another.

15. The cast metal heat exchanger housing in accordance with claim 9, wherein:
- the sprue cross-sectional area comprises a plurality of diagonal ribs starting from the central runner;
- upon cutting off of the sprue, the axial end face is formed extending into the diagonal ribs.

16. The cast metal heat exchanger housing in accordance with claim 15, wherein:
- upon cutting off of the sprue, the axial end face is formed with an end face area of a central attachment;
- upon cutting off of the sprue, the axial end face is formed with end face areas of the diagonal ribs; or
- upon cutting off of the sprue, the axial end face is formed with an end face area of a central attachment and with an end face areas of the diagonal ribs.

17. A process for manufacturing a cast metal heat exchanger housing, the process comprising:
- metal casting the metal heat exchanger housing comprising a vehicle heater pot-shape housing wall elongated in a direction of a housing longitudinal axis and comprising a plurality of heat transfer ribs extending in the direction of the housing longitudinal axis on an outer side of the housing wall in an area of a circumferential wall of the housing wall and in an area of a bottom wall of the housing wall, wherein a sprue cross-sectional area provided in a casting mold, through which molten metallic material is poured during the metal casting, comprises, in a plane perpendicular to the housing longitudinal axis, a central runner and, starting from the central runner, at least some of the heat transfer ribs;
- cooling the metallic material after metal casting the metal heat exchanger housing; and
- cutting off a sprue from the heat exchanger housing at a location corresponding to the plane that is at right angles to the housing longitudinal axis to form an axial end face of the heat exchanger housing after cooling the metallic material, the axial end face being provided in the casting mold at the plane perpendicular to the housing longitudinal axis and the axial end face being perpendicular to the housing longitudinal axis and extending into the area of at least some of the heat transfer ribs, the axial end face having an axial end face shape, the sprue cross sectional area having a sprue cross sectional area shape, wherein the axial end face shape is the same as the sprue cross sectional area shape.

18. The process in accordance with claim 17, wherein the sprue cross-sectional area comprises a plurality of diagonal ribs starting from the central runner.

19. The process in accordance with claim 18, wherein the plurality of diagonal ribs comprise four diagonal ribs that extend starting from the central runner and wherein:
- two of the diagonal ribs extend diametrically in relation to one another away from the central runner; or
- diagonal ribs arranged directly adjacent to one another in a circumferential direction are arranged essentially at right angles to one another; or
- two of the four diagonal ribs extend diametrically in relation to one another away from the central runner and diagonal ribs arranged directly adjacent to one another in a circumferential direction are arranged essentially at right angles to one another.

20. The process in accordance with claim 18, wherein:
- at least some of the heat transfer ribs extend starting from the central runner in the area of the sprue cross-sectional area; or
- at least some of the heat transfer ribs extend starting from the diagonal ribs in the area of the sprue cross-sectional area; or
- at least some of the heat transfer ribs extend starting from the central runner in the area of the sprue cross-sectional area and at least some of the heat transfer ribs extend starting from the diagonal ribs in the area of the sprue cross-sectional area.

* * * * *